UNITED STATES PATENT OFFICE.

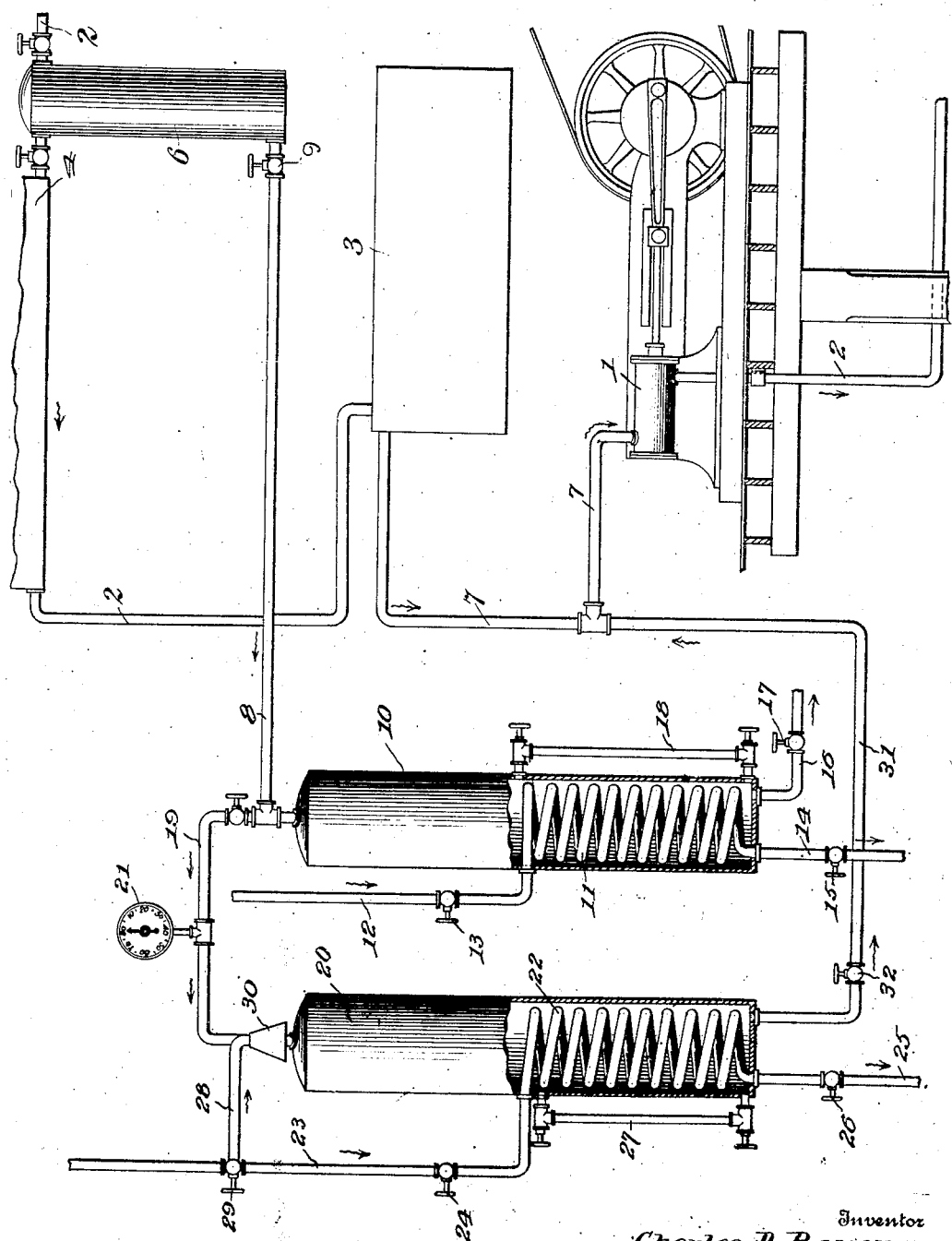

CHARLES DANIEL BAUER, OF SPRINGFIELD, OHIO.

APPARATUS FOR SEPARATING OIL FROM AMMONIA IN REFRIGERATING SYSTEMS.

No. 930,128.  Specification of Letters Patent.  Patented Aug. 3, 1909.

Application filed June 24, 1907. Serial No. 380,405.

*To all whom it may concern:*

Be it known that I, CHARLES D. BAUER, a citizen of the United States, residing at Springfield, in the county of Clark and State of Ohio, have invented certain new and useful Improvements in Apparatus for Separating Oil from Ammonia in Refrigerating Systems, of which the following is a specification, reference being had therein to the accompanying drawings.

This invention relates to apparatus for separating oil from ammonia in refrigerating systems, and has for its object to provide a simple and effective construction, whereby the ammonia may be freed from the oil with which it becomes mingled in its passage through the system, the purified ammonia being returned to the system, and the oil separated therefrom being discharged at a separate point.

To these ends the invention consists in certain novel features which I will now proceed to describe, and will then particularly point out in the claims.

In the accompanying drawings I have shown, partly in elevation and partly in section, an apparatus embodying my invention in one form.

In these drawings I have illustrated one embodiment of my invention and have shown an engine or compressor 1, of ordinary construction, connected by a pipe 2 with a cooling room or refrigerating tank 3. Interposed between the compressor and the cooling room or tank 3 is a trap 6 and a condenser 4 which may be of any suitable construction. A pipe 7 leads from the cooling room or tank 3 to the suction side of the compressor 1. These parts may be of any suitable construction, the oil and a portion of the ammonia accumulating in the trap 6. From the lower end of this trap a pipe 8, provided with a valve 9, leads to a heating tank or separator 10. This tank is provided with suitable means for heating it, consisting preferably of a steam coil 11, located within the tank and connected by a supply pipe 12, provided with a valve 13, to a suitable source of supply of steam. An exhaust pipe 14, provided with a valve 15, permits the escape of the steam from the heating coil. Said tank is also provided at its bottom with an oil outlet pipe 16, provided with a valve 17, and said tank is further provided with a gage 18, to indicate the condition of affairs within the tank.

From the top of the tank 10, a pipe 19 leads to a chilling tank or condenser 20. The pipe 19 is preferably provided with a pressure indicating gage 21. The tank 20 is provided with means for cooling the same, consisting preferably of a coil 22, located within the tank and connected by means of a supply pipe 23, having a controlling valve 24, with a suitable source of supply of cold water. Said coil is provided at its discharge end with an outlet pipe 25, having a controlling valve 26. The tank 20 is further provided with a gage 27, to indicate the condition of the contents thereof. As a further means for cooling the contents of the condenser, I provide a branch pipe 28, leading from the supply pipe 23, and provided with a controlling valve 29. The pipe 28 terminates above the tank 20 in a sprinkler or distributer 30, by means of which the cold water is distributed over the outside of the tank 20. A return pipe 31 leads from the lower part of the tank 20 to the suction pipe 7 of the engine 1, and is provided with a controlling valve 32.

The apparatus thus constructed operates in the following manner. When a quantity of ammonia and oil has accumulated in the trap 6, the valve 9 may be opened, allowing the mixture to pass into the tank 10. Here the mixture becomes heated and separates, the ammonia passing over through the pipe 19 into the condenser 20, while the oil remains in the separator 10, from which it may be drawn out through the pipe 16. The ammonia vapor is condensed in the chilling tank 20, and is drawn through the pipe 31 back into the system by the suction of the engine, reëntering the system in a purified condition, free from oil. As the oil accumulates in the separator 10, its amount can be determined by means of the gage 18, and it may be withdrawn at intervals, as desired. The entire separating system may be connected with the refrigerating system at any time by opening the valves 9 and 32, and it may be disconnected, when not in use, by closing the same valves. In this way the ammonia may be freed from the oil which it accumulates, and may be used over and over again, since it does not require to be withdrawn and replaced by pure ammonia periodically, as is usually the case.

I do not wish to be understood as limiting myself strictly to the precise details of construction hereinbefore described and shown in the accompanying drawings, as the same may be obviously modified without departing from the principle of my invention.

Having thus fully described my invention, what I claim as new and desire to secure by Letters Patent is:—

1. The combination, with a refrigerating system comprising a pump, a condenser, a trap and connecting pipes, of a separating apparatus comprising a heating tank or separator proper connected with the trap and having an oil outlet pipe connected with its lower portion and a vapor outlet in its upper portion, a steam coil for said heating tank, a chilling tank or condenser, a pipe connecting the vapor outlet of the heating tank with the upper portion of the chilling tank, a water coil within said chilling tank for cooling the same, a pipe connecting said chilling tank with the suction side of the pump, and valves controlling the connections between the separator and trap and between the chilling tank and pump.

2. The combination, with a refrigerating system comprising a pump, a condenser, a trap and connecting pipes, of a separating apparatus comprising a heating tank or separator proper connected with the trap and having an oil outlet connected with its lower portion and a vapor outlet connected with its upper portion, a steam coil for heating said tank, a chilling tank or condenser connected with the vapor outlet of the heating tank, a water coil within said chilling tank for cooling the same, means for spraying water upon the exterior of said chilling tank, a pipe connecting said chilling tank with the suction side of said pump, and valves controlling the connections between the separator and trap and between the chilling tank and pump.

In testimony whereof, I affix my signature in presence of two witnesses.

CHARLES DANIEL BAUER.

Witnesses:
E. O. HAGAN,
HARRIET L. HAMMAKER.